US012249772B2

(12) United States Patent
Tai et al.

(10) Patent No.: US 12,249,772 B2
(45) Date of Patent: Mar. 11, 2025

(54) ELECTRONIC DEVICE

(71) Applicant: WISTRON NEWEB CORPORATION, Hsinchu (TW)

(72) Inventors: Chih-Feng Tai, Hsinchu (TW); Kuan-Hsun Lai, Hsinchu (TW); Kuei-Cheng Wang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 143 days.

(21) Appl. No.: 17/719,466

(22) Filed: Apr. 13, 2022

(65) Prior Publication Data

US 2023/0106688 A1 Apr. 6, 2023

(30) Foreign Application Priority Data

Oct. 4, 2021 (TW) ................................ 110136805

(51) Int. Cl.

| | |
|---|---|
| ***H01Q 5/10*** | (2015.01) |
| ***H01Q 5/25*** | (2015.01) |
| ***H01Q 5/35*** | (2015.01) |
| ***H01Q 5/378*** | (2015.01) |
| ***H01Q 9/04*** | (2006.01) |
| ***H01Q 13/10*** | (2006.01) |

(52) U.S. Cl.

CPC ................. *H01Q 5/10* (2015.01); *H01Q 5/25* (2015.01); *H01Q 5/35* (2015.01); *H01Q 5/378* (2015.01); *H01Q 9/045* (2013.01); *H01Q 13/10* (2013.01)

(58) Field of Classification Search

CPC .. H01Q 1/22; H01Q 1/48; H01Q 1/52; H01Q 1/24; H01Q 5/30; H01Q 1/36; H01Q 1/38

See application file for complete search history.

(56) References Cited

U.S. PATENT DOCUMENTS

| | | | | |
|---|---|---|---|---|
| 5,485,167 | A * | 1/1996 | Wong | H01Q 21/062 343/834 |
| 10,490,902 | B2 * | 11/2019 | Yen | H01Q 13/10 |
| 10,511,079 | B2 * | 12/2019 | Wu | H01Q 1/2266 |
| 10,971,807 | B2 * | 4/2021 | Tseng | H01Q 5/378 |
| 2004/0227683 | A1 * | 11/2004 | Caimi | H01Q 9/40 343/742 |

(Continued)

FOREIGN PATENT DOCUMENTS

| | | | |
|---|---|---|---|
| TW | 201703350 | A | 1/2017 |
| TW | I682581 | B | 1/2020 |

*Primary Examiner* — Graham P Smith
*Assistant Examiner* — Austin M Back
(74) *Attorney, Agent, or Firm* — McClure, Qualey & Rodack, LLP

(57) ABSTRACT

An electronic device is provided. The electronic device includes a metal housing, a substrate and a radiating element. The metal housing is provided with a slot, and the slot includes an opening end and a closed end. The slot has a first wall of the slot and a second wall of the slot opposite to each other at the position of the opening end. The first wall of the slot is located between the second wall of the slot and the closed end. There is a predetermined distance between the first wall of the slot and the closed end. A feeding portion of the radiating element is connected to a feeding element and a signal is fed through the feeding element, so that the radiating element is used for exciting the metal housing to generate at least one resonance frequency.

12 Claims, 5 Drawing Sheets

(56) References Cited

U.S. PATENT DOCUMENTS

| | | | | |
|---|---|---|---|---|
| 2014/0361948 | A1* | 12/2014 | Tanaka | H01Q 1/243<br>343/861 |
| 2017/0005414 | A1* | 1/2017 | Yang | H01Q 1/243 |
| 2020/0185813 | A1* | 6/2020 | Chang | H01Q 1/48 |
| 2021/0167499 | A1* | 6/2021 | Tseng | H01Q 5/385 |

* cited by examiner

ELECTRONIC DEVICE

CROSS-REFERENCE TO RELATED PATENT APPLICATION

This application claims the benefit of priority to Taiwan Patent Application No. 110136805, filed on Oct. 4, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, in particular to an electronic device with a slot antenna design.

BACKGROUND OF THE DISCLOSURE

Currently, with the development of the 5th Generation Mobile Networks (5G), the design of the existing antenna structure can no longer meet the operating frequency band of the 5th generation communication system (e.g., the Sub-6 frequency band). In addition, since there are more and more components inside the existing communication products, and the housing of the device tends to be designed in metal for lightness and beauty, the available space for the antenna inside the communication product is less and less.

Therefore, how to overcome the problem of insufficient space required by the antenna design inside the electronic device to meet all the frequency bands of Sub-6 by improving the design of the antenna structure inside the electronic device has become an important issue to be solved.

SUMMARY OF THE DISCLOSURE

In response to the above-referenced technical inadequacies, the present disclosure provides an electronic device.

In order to solve the above technical problems, one technical solution adopted by the present disclosure is to provide an electronic device. The electronic device includes a metal housing, a carrier board, and a radiating element. The metal housing has a slot and the slot includes an opening end and a closed end. The slot has a first slot wall and a second slot wall and the first slot wall and the second slot wall are disposed on two sides of the opening end. The first slot wall is disposed between the second slot wall and the closed end, and there is a predetermined distance between the first slot wall and the closed end. The carrier board is disposed in the metal housing. The radiating element is disposed on the carrier board. The radiating element includes a feeding portion. A vertical projection of the radiating element on the metal housing at least partially overlaps the slot. The feeding portion is connected to a feeding element and a signal is fed into the feeding portion through the feeding element, so that the radiating element is used to excite the metal housing to generate at least one resonance frequency. A first segment line parallel to the first slot wall is defined between the first slot wall and the closed end, the distance between the first segment line and the first slot wall is half of the predetermined distance. The feeding portion is disposed in the region between the first segment line and the first slot wall.

One of the beneficial effects of the present disclosure is that the electronic device provided by the present disclosure, by technical solutions of "the metal housing having a slot" and "a first segment line parallel to the first slot wall being defined between the first slot wall and the closed end, the distance between the first segment line and the first slot wall being half of the predetermined distance, and the feeding portion being disposed in the region between the first segment line and the first slot wall," may overcome the problem of insufficient space required by the current antenna design inside electronic devices, and meet all frequency bands of Sub-6.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
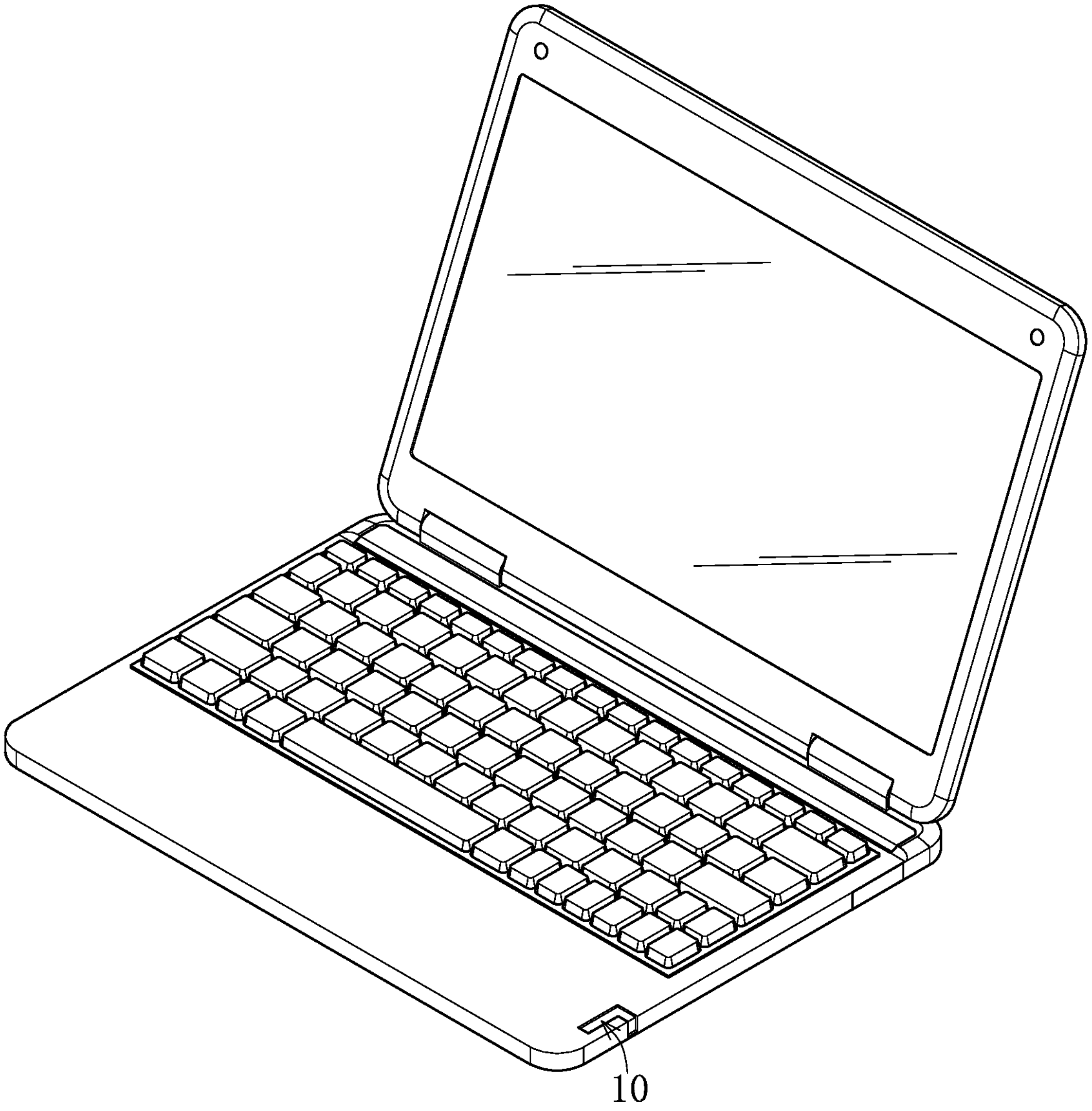
FIG. 1 is a schematic view of an electronic device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like. In addition, the term "connect" used herein refers to a physical connection between two elements, which can be a direct connection or an indirect connection. The terms "couple" and "coupling to" used herein refers to two elements being separated and having no physical connection, and an electric field generated by a current of one of the two elements excites that of the other one.

Figure 2:
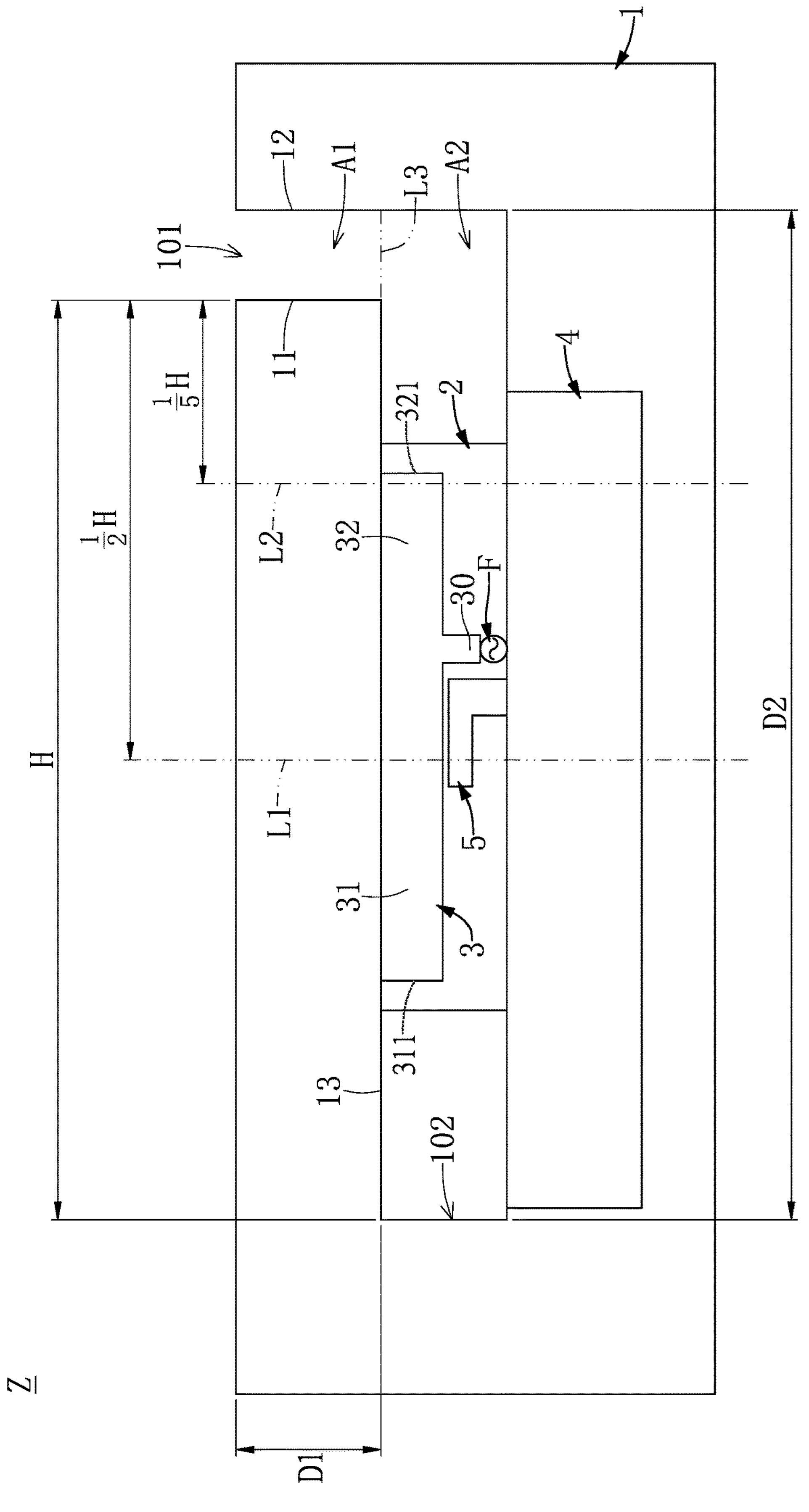
FIG. 2 is an enlarged view of the electronic device of the present disclosure at the slot position.

Referring to FIG. 1 and FIG. 2, an embodiment of the present disclosure provides an electronic device Z. The electronic device Z includes a metal housing 1, a carrier board 2 and a radiating element 3. The metal housing 1 has a slot 10. The slot 10 is located on the side frame of the electronic device Z as shown in FIG. 1. For example, the electronic device Z may be a laptop. The housing of the electronic device Z generally includes an upper housing and a lower housing, the upper housing may be the C part of the laptop, and the upper housing includes a side frame. The lower housing may be the D part of the laptop, and in the present disclosure, the metal housing 1 with the slot 10 is used to represent the upper housing. In addition, in the present disclosure, the slot 10 is formed along the side of the upper housing (covering the side frame), and is L-shaped.

Referring FIG. 2, the slot 10 includes an opening end 101 and a closed end 102. The slot 10 has a first slot wall 11, a second slot wall 12 and a third slot wall 13. The first slot wall 11 and the second slot wall 12 are disposed on two sides of the opening end 101 respectively and are parallel to each other. The first slot wall 11 is disposed between the second slot wall 12 and the closed end 102. The third slot wall 13 is connected between the closed end 102 and the first slot wall 11, and the third slot wall 13 is perpendicular to the first slot wall 11 and the second slot wall 12.

As mentioned above, the carrier board 2 is disposed in the metal housing 1, and the radiating element 3 is disposed on the carrier board 2. For example, the radiating element 3 may be a metal sheet, a metal wire or other conductors with conductive effect, and the carrier 2 can be, for example, an epoxy glass fiber substrate (FR-4), but the present disclosure is not limited to. The radiating element 3 has a feeding portion 30, and the vertical projection of the radiating element 3 on the metal housing 1 overlaps at least partially or completely with the slot 10. The feeding portion 30 is connected to a feeding element F, and the feeding element F may be, for example, a coaxial cable. The feeding portion 30 is fed a signal through the feeding element F, so that the radiating element 3 excites the metal housing 1 to generate at least one resonance frequency. Thereby, the radiating element 3, the feeding element F and the slot 10 form an antenna structure. Further, there is a predetermined distance H between the first slot wall 11 and the closed end 102. A first segment line L1 parallel to the first slot wall 11 can be defined between the first slot wall 11 and the closed end 102, and the distance between the first segment line L1 and the first slot wall 11 is half of the predetermined distance H, and the feeding portion 30 is disposed in the region between the first segment line L1 and the first slot wall 11. More specifically, a second segment line L2 parallel to the first slot wall 11 can be defined between the first slot wall 11 and the closed end, and the distance between the second segment line L2 and the first slot wall 11 is one-fifth of the predetermined distance H, and the feeding portion 30 is disposed in the region between the first segment line L1 and the second segment line L2. In this way, the present disclosure changes the resonance frequency of the antenna structure by adjusting the relative position of the feeding portion 30 in the slot 10.

Referring to FIG. 2, the slot 10 defines a first axis and a second axis (not shown in FIG. 2) according to the extending directions of the slot 10. The first axis is parallel to the extending direction of the slot 10 toward the opening end 101. The second axis is parallel to the extending direction of the slot 10 extending toward the closed end 102. The slot 10 defines a first slot region A1 along the first axis, and defines a second slot region A2 along the second axis. Specifically, the first slot region A1 and the second slot region A2 are actually connected, and a third segment line L3 can be used to separate the two regions. Therefore, the region above the third segment line L3 in FIG. 2 is the first slot region A1, and the region below the third segment line L3 is the second slot region A2. When the radiating element 3 is coupling to the slot 10 to excite the metal housing 1, a first resonance frequency band is generated in the first slot region A1, and a second resonance frequency band is generated in the second slot region A2. The first resonance frequency band is greater than the second resonance frequency band. For example, the frequency range of the first resonance frequency band is 4200 MHz to 4800 MHz, and the frequency range of the second resonance frequency band is 617 MHz to 960 MHz. However, the present disclosure is not limited thereto. In the present disclosure, by adjusting the relative position of the feeding portion 30 in the slot 10 (the feeding portion 30 is disposed in the region between the first segment line L1 and the second segment line L2), the feeding portion 30 is close to the first slot wall 11, so that the length of the resonance path excited by the radiating element 3 coupling to the second slot region A2 of the slot 10 (which will pass through the frame portion of the metal housing 1 on the upper edge of the slot 10) may be equal to the wavelength of the center frequency of the second resonance frequency band, which enables the frequency range generated by the antenna structure of the present disclosure to extend to lower frequency band to 617 MHz. It is particularly noted that the L-shaped slot 10 can increase the bandwidth of the first resonance frequency band and the bandwidth of the second resonance frequency band.

Based on the above, the radiating element 3 further includes a first radiating portion 31 and a second radiating portion 32 connected to the feeding portion 30. The first radiating portion 31 has an open end 311, and the second radiating portion 32 has an open end 321. The first radiating portion 31 and the second radiating portion 32 extend in opposite directions, so that the radiating element 3 is a T-shape. However, the present disclosure is not limited to the shape of the radiating element 3. In other embodiments, the radiating element 3 can also include only the first radiating portion 31 and the feeding portion 30 (without the second radiating portion), and represents an L-shaped shape. The first radiating portion 31 is used to generate a first operating frequency band. The second radiating portion 32 is used to generate a second operating frequency band. The first operating frequency band is different from the second operating frequency band. In addition, the electronic device Z further includes a grounding element 4 and a parasitic element 5 connected to the grounding element 4. The grounding element 4 is connected to the metal housing 1, and the grounding element 4 may be a copper foil, which is attached to the metal housing 1 by conductive glue. The vertical projection of the parasitic element 5 on the metal housing 1 overlaps at least partially or completely with the slot 10. As shown in FIG. 2, the parasitic element 5 is bent and extended in an L-shaped shape. The parasitic element 5 and the first radiating portion 31 are separated from and coupling to each other to generate a third operating frequency band. However, the present disclosure is not limited to the shape of the parasitic element 5. In this embodiment, the third operating frequency band is greater than the second operating frequency band, and the second operating frequency band is greater than the first operating frequency band. For example, the frequency range of the first operating frequency band is 1425 MHz to 2700 MHZ, the frequency range of the second operating frequency band is 3300 MHz to 4200 MHz, and the frequency range of the third operating frequency band is 5150 MHz to 5925 MHz. However, the present disclosure is not limited thereto. Further, the total length of the first radiating portion 31 and the feeding portion 30 is a quarter wavelength of a center frequency of the first operating frequency band. The total length of the second radiating part 32 and the feeding part 30 is a quarter wavelength of a center frequency of the second operating frequency band. The length of the parasitic element 5 is a quarter wavelength of a center frequency of the third operating frequency band wavelength.

Figure 3:
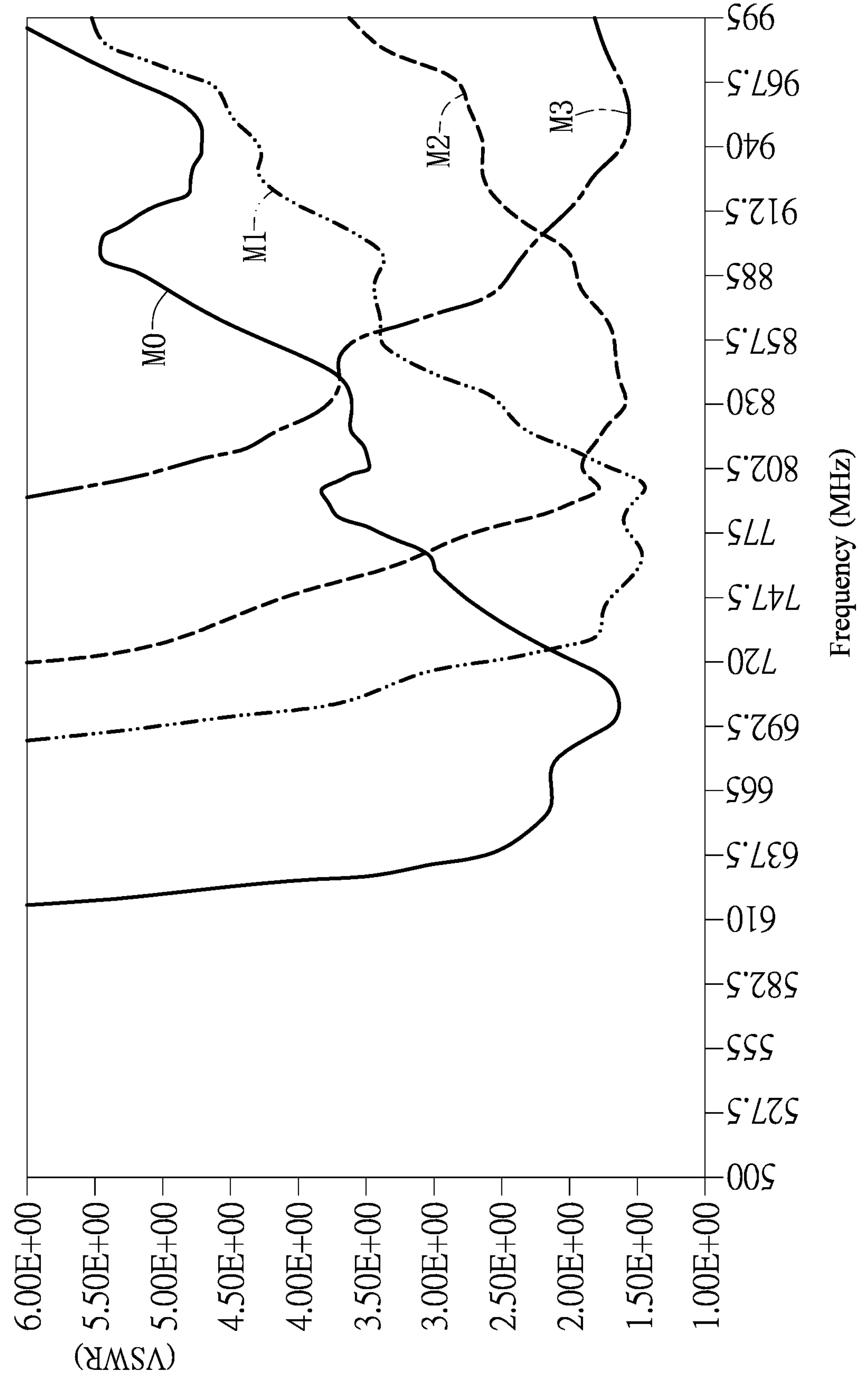
FIG. 3 is a diagram of a voltage standing wave ratio of a second resonance frequency band of the slot of the electronic device of the present disclosure under different second predetermined lengths.
Figure 4:
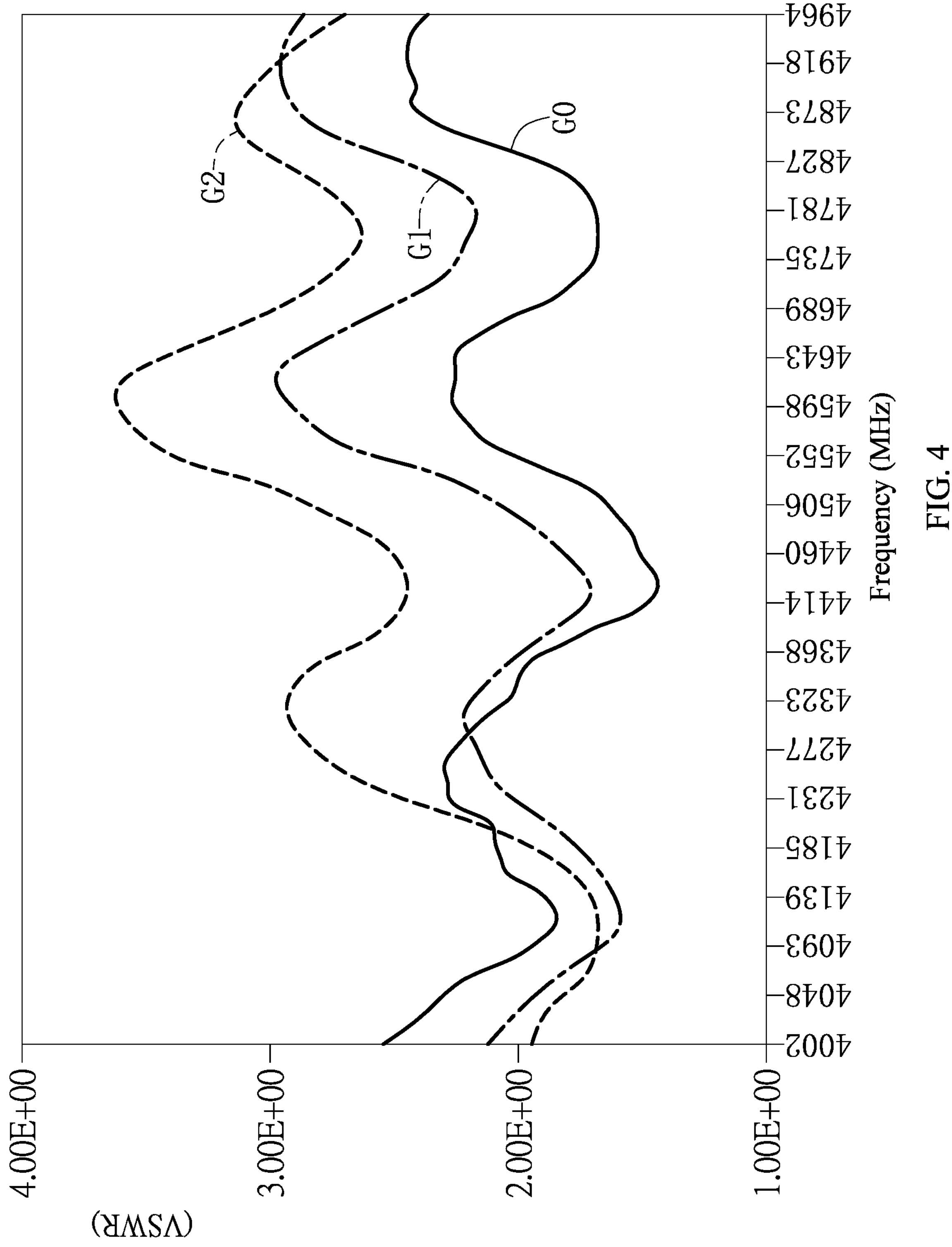
FIG. 4 is a diagram of a voltage standing wave ratio of a first resonance frequency band of the slot of the electronic device of the present disclosure under different first predetermined lengths.
Figure 5:
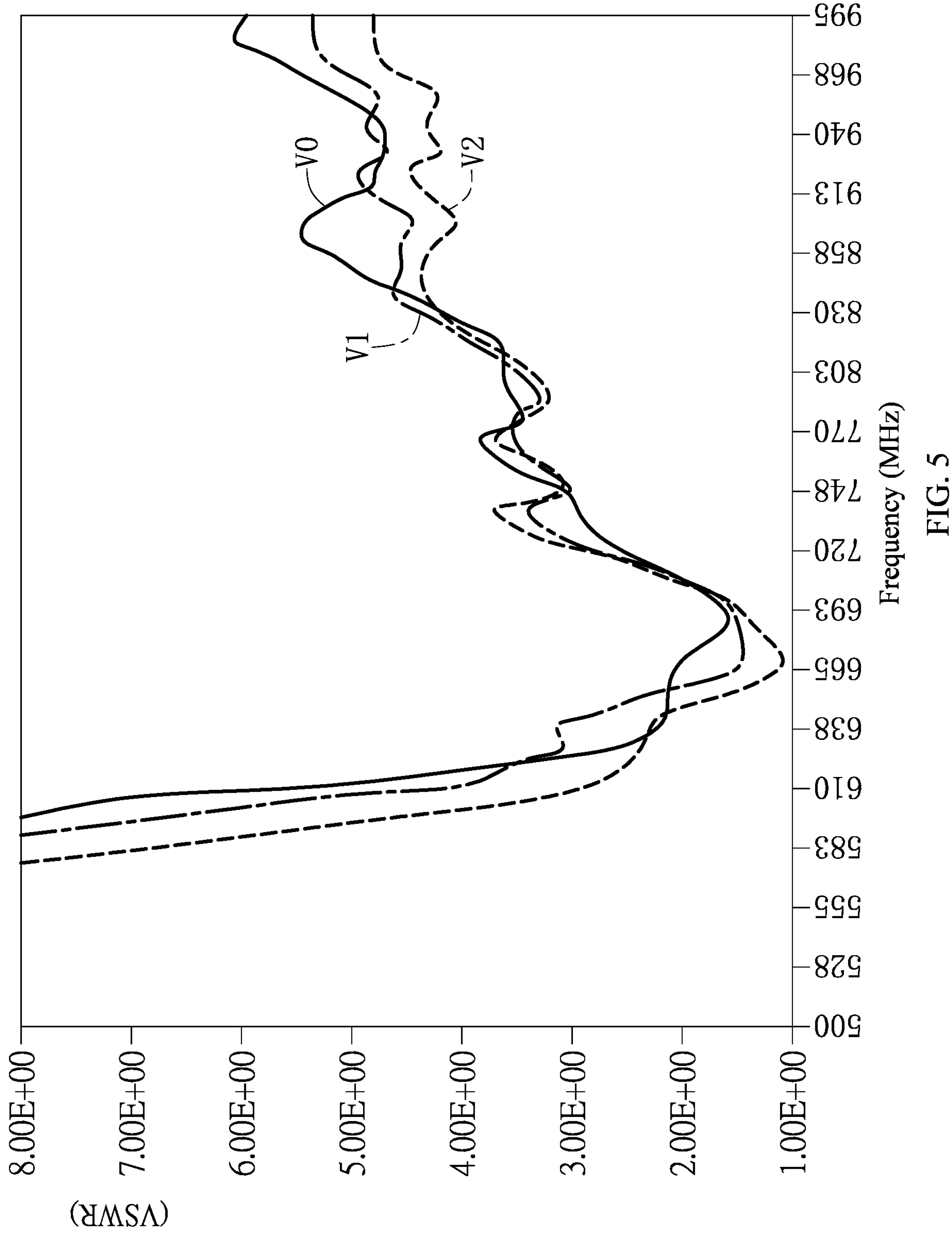
FIG. 5 is a diagram of a voltage standing wave ratio of a second resonance frequency band of the slot of the electronic device of the present disclosure under different first predetermined lengths.

Next, referring to FIG. 2 and referring to FIGS. 3 to 5, FIG. 3 is a diagram of a voltage standing wave ratio of the second resonance frequency band of the slot of the electronic device of the present disclosure under different second predetermined lengths. FIG. 4 is a diagram of a VSWR of the first resonance frequency band of the slot of the electronic device of the present disclosure under different first predetermined lengths. FIG. 5 is a diagram of a VSWR of the second resonance frequency band of the slot of the electronic device of the present disclosure under different first predetermined lengths. There is a first predetermined length D1 between the opening end 101 and the third slot wall 13. There is a second predetermined length D2 between the closed end 102 and the second slot wall 12. It should be noted that the first predetermined length D1 is not limited by the shape of the metal housing 1 located at the upper edge of the slot 10 close to the opening end 101. For example, the shape of the junction portion between the metal housing 1 located at the upper edge of the slot 10, the first slot wall 11 and the third slot wall 13 may be stepped, but the first predetermined length D1 is still defined by the distance between the side of the opening end 101 directly connecting one side of the closed end 102 (that is, the third slot wall 13).

Continuing to refer to FIG. 4, the present disclosure may change the frequency range of the first resonance frequency band by adjusting the first predetermined length D1. For example, the curve G0 in FIG. 4 is the mode when the first predetermined length D1 is equal to 7 mm, then the curve G1 is the mode when the first predetermined length D1 is increased by 5 mm to become 12 mm, and the curve G2 is The mode when adding 10 mm to the first predetermined length D1 becomes 17 mm. Therefore, it can be seen from FIG. 4 that when the first predetermined length D1 is gradually increased, the frequency range of the first resonance frequency band may gradually shift to the low frequency range. However, it should be noted that, in the present disclosure, the first predetermined length D1 is greater than 4 mm, preferably between 4 mm and 9 mm. In addition, the distance between the first slot wall 11 and the second slot wall 12 can be between 4 mm and 7 mm, and the range can be adjusted according to practical needs.

Continuing to refer to FIG. 3, the present disclosure may change the frequency range of the second resonance frequency band by adjusting the second predetermined length D2. For example, the curve M0 in FIG. 3 is the mode when the second predetermined length D2 is equal to 57 mm, then the curve M1 is the mode when the second predetermined length D2 minus 5 mm becomes 52 mm, and the curve M2 is the mode when the second predetermined length D2 minus 10 mm becomes 47 mm, and the curve M3 is the mode when the second predetermined length D2 minus 15 mm becomes 42 mm. Therefore, it can be seen from FIG. 3 that when the second predetermined length D2 is gradually reduced, the frequency range of the second resonance frequency band is gradually shifted to the high frequency range. However, it should be noted that, in the present invention, the second predetermined length D2 is between 50 mm and 65 mm, preferably 57 mm.

Continuing to refer to FIG. 5, the present disclosure may change the bandwidth of the second resonance frequency band by adjusting the first predetermined length D1. For example, if the curve V0 in FIG. 5 is the mode when the first predetermined length D1 is equal to 5 mm, the curve V1 is the mode when the first predetermined length D1 increases by 2 mm and becomes 7 mm, and the curve V2 is the mode when the first predetermined length D1 increases by 5 mm and becomes 10 mm. Therefore, as can be seen from FIG. 5, when the first predetermined length D1 gradually increases, the bandwidth of the second resonance frequency band may gradually increase, or when the first predetermined length D1 gradually decreases, the bandwidth of the second resonance frequency band may gradually decrease.

One of the beneficial effects of the present disclosure is that the electronic device provided by the present disclosure, by technical solutions of "the metal housing 1 having a slot 10" and "a first segment line L1 parallel to the first slot wall 11 being defined between the first slot wall 11 and the closed end 102, the distance between the first segment line L1 and the first slot wall 11 being half of the predetermined distance H, and the feeding portion 30 being disposed in the region between the first segment line L1 and the first slot wall 11," may overcome the problem of insufficient space required by the current antenna design inside electronic devices, and meet all frequency bands of Sub-6 (617 MHz-6000 MHz).

Further, in the present disclosure, by adjusting the relative position of the feeding portion 30 in the slot 10 (the feeding portion 30 is located in the region between the first segment line L1 and the second segment line L2), the feeding portion 30 is close to the first slot wall 11 to make the length of the resonance path excited by the radiating element 3 coupling to the second slot region A2 of the slot 10 equal to the wavelength of the center frequency of the second resonance frequency band. The frequency range generated by the antenna structure of the present disclosure may extend low frequency to 617 MHz frequency band.

Furthermore, the present disclosure may change the frequency range of the first resonance frequency band and the bandwidth of the second resonance frequency band by adjusting the first predetermined length D1, and the present disclosure may also change the frequency range of the second resonance frequency band by adjusting the second predetermined length D2. When the first predetermined length D1 gradually increases, the frequency range of the first resonance frequency band may gradually shift to the low frequency range. When the second predetermined length D2 gradually decreases, the frequency range of the second resonance frequency band will gradually shift to the high frequency range. When the first predetermined length D1 gradually increases, the bandwidth of the second resonance frequency band may gradually increase.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a metal housing, having a slot, the slot including an opening end and a closed end, the slot having a first slot wall and a second slot wall, the first slot wall and the second slot wall disposed on two sides of the opening end, respectively, the first slot wall being disposed between the second slot wall and the closed end, and there being a predetermined distance between the first slot wall and the closed end;

a carrier board, disposed in the metal housing; and a radiating element, disposed on the carrier board, the radiating element including a feeding portion, a first radiating portion, and a second radiating portion, each of the first radiating portion and second radiating portion having an open end, the first radiating portion and the second radiating portion being connected to the feeding portion, the first radiating portion and the second radiating portion being directly connected with each other, the feeding portion, the first radiating portion, and the second radiating portion jointly forming a T-shaped structure, the first radiating portion and the second radiating portion extending in different directions, a vertical projection of the radiating element on the metal housing at least partially overlapping the slot, the feeding portion connected to a feeding element and a signal being fed into the feeding portion through the feeding element, so that the radiating element is used to excite the metal housing to generate at least one resonance frequency;

wherein a first segment line parallel to the first slot wall is defined between the first slot wall and the closed end, a distance between the first segment line and the first slot wall is half of the predetermined distance, the feeding portion is disposed in the region between the first segment line and the first slot wall, and the first slot wall is closer to the first segment line than the second slot wall;

wherein the first radiating portion is used to generate a first operating frequency band, the second radiating portion is used to generate a second operating frequency band, and the first operating frequency band is different from the second operating frequency band;

wherein the open end of the first radiating portion is located between the closed end and first segment line, and the open end of the second radiating portion is located between the first slot wall and the first segment line;

wherein the slot is L-shaped, a first axis and a second axis are defined according to the extending directions of the slot, the first axis is parallel to the extending direction of the slot toward the opening end, the second axis parallel to the extending direction of the slot extending toward the closed end, the slot defines a first slot region along the first axis and a second slot region along the second axis, the radiating element is used to excite the metal housing to generate a first resonance frequency band in the first slot region and generate a second resonance frequency band in the second slot region, and the first resonance frequency band is greater than the second resonance frequency band.

2. The electronic device of claim 1, wherein a second segment line parallel to the first slot wall is defined between the first slot wall and the closed end, a distance between the second segment line and the first slot wall is one-fifth of the predetermined distance, and the feeding portion is disposed in the region between the first segment line and the second segment line.

3. The electronic device of claim 1, wherein a frequency range of the first resonance frequency band is 4200 MHz to 4800 MHZ, and a frequency range of the second resonance frequency band is 617 MHz to 960 MHz.

4. The electronic device of claim 1, wherein the slot further includes a third slot wall, the third slot wall is connected between the closed end and the first slot wall, and a first predetermined length between the opening end and the third slot wall is greater than 4 mm.

5. The electronic device of claim 4, wherein the first predetermined length is between 4 mm and 9 mm.

6. The electronic device of claim 1, wherein a second predetermined length between the closed end and the second slot wall is between 50 mm and 65 mm.

7. The electronic device of claim 1, wherein the first radiating portion and the second radiating portion extend in opposite directions.

8. The electronic device of claim 7, wherein a total length of the first radiating portion and the feeding portion is a quarter wavelength of a center frequency of the first operating frequency band and a total length of the second radiating portion and the feeding portion is a quarter wavelength of the center frequency of the second operating frequency band.

9. The electronic device of claim 7, further including a grounding element and a parasitic element connected to the grounding element, the grounding element connected to the metal housing, the vertical projection of the parasitic element on the metal housing at least partially overlapping the slot, the parasitic element and the first radiating portion separated from and coupling to each other to generate a third operating frequency band, the third operating frequency band being greater than the second operating frequency band, and the second operating frequency band being greater than the first operating frequency band.

10. The electronic device of claim 9, wherein a frequency range of the first operating frequency band is 1425 MHz to 2700 MHZ, a frequency range of the second operating frequency band is 3300 MHz to 4200 MHz, and a frequency range of the third operating frequency band is 5150 MHz to 5925 MHz.

11. The electronic device of claim 9, wherein the parasitic element is bent and extended in L-shaped and is separated from and coupling to the first radiating portion, and a length of the parasitic element is a quarter wavelength of a center frequency of the third operating frequency band.

12. The electronic device of claim 2, wherein the open end of the second radiating portion is located between the first slot wall and the second segment line.

* * * * *